United States Patent
Schüle et al.

(10) Patent No.: US 9,771,926 B2
(45) Date of Patent: Sep. 26, 2017

(54) STEAM POWER PLANT WITH A GROUND HEAT EXCHANGER

(75) Inventors: Volker Schüle, Leimen (DE); Silvia Velm, Karlsruhe (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 742 days.

(21) Appl. No.: 13/877,169

(22) PCT Filed: Sep. 30, 2011

(86) PCT No.: PCT/EP2011/067178
§ 371 (c)(1),
(2), (4) Date: May 17, 2013

(87) PCT Pub. No.: WO2012/042039
PCT Pub. Date: Apr. 5, 2012

(65) Prior Publication Data
US 2013/0219891 A1    Aug. 29, 2013

(30) Foreign Application Priority Data

Sep. 30, 2010 (EP) .................................. 10012540

(51) Int. Cl.
*F01K 9/00* (2006.01)
*F03G 6/06* (2006.01)
(Continued)

(52) U.S. Cl.
CPC ................. *F03G 6/06* (2013.01); *F01K 7/38* (2013.01); *F01K 7/40* (2013.01); *F01K 9/00* (2013.01);
(Continued)

(58) Field of Classification Search
CPC .......... F03G 7/04; F24J 3/084; H02K 7/1823; Y02E 10/125; F01K 9/00; F01K 9/003;
(Continued)

(56) References Cited

U.S. PATENT DOCUMENTS 4,081,966 A * 4/1978 deGeus ................... F03G 6/065
126/636
4,091,636 A * 5/1978 Margen ................... F25B 30/06
165/45
(Continued)

FOREIGN PATENT DOCUMENTS

DE         2550908 A1 *  5/1977  ............ F01K 9/003
ES         2334758 A1    3/2010
(Continued)

OTHER PUBLICATIONS

International Search Report and Written Opinion, International Searching Authority, PCT Application No. PCT/EP2011/067178, Search completed May 8, 2012, Authorized Officer Stephane Coquau.
(Continued)

*Primary Examiner* — Laert Dounis
(74) *Attorney, Agent, or Firm* — GE Global Patents Operation; Marc A. Vivenzio

(57) ABSTRACT

A Steam power plant comprising a steam turbine (3) and a condenser (5), wherein the condenser (5) is disclosed, comprising a first heat sink being a ground heat exchanger (29) is connected to the condenser during times when ground temperature is lower than air temperature; and a second heat sink being an above-ground heat exchanger is connected to the condenser during times when ground temperature is not lower than air temperature.

13 Claims, 3 Drawing Sheets

(51) Int. Cl.
    *F01K 7/38*    (2006.01)
    *F01K 7/40*    (2006.01)

(52) U.S. Cl.
    CPC ............... *F01K 9/003* (2013.01); *Y02B 10/20* (2013.01); *Y02E 10/46* (2013.01)

(58) Field of Classification Search
    CPC .. F24F 5/0046; F24F 5/005; F24F 2005/0053; F24F 2005/0057; F25B 2313/002; Y02B 10/40; Y02B 30/547
    USPC ......... 60/641.1–641.15; 165/104.31, 104.32, 165/45; 62/260
    See application file for complete search history.

(56) References Cited

U.S. PATENT DOCUMENTS

| | | | |
|---|---|---|---|
| 6,820,420 B2* | 11/2004 | Hebert .................... | F03G 6/003 165/45 |
| 6,896,054 B2* | 5/2005 | Mcclung, III .......... | E21B 17/01 166/246 |
| 2009/0121488 A1* | 5/2009 | Bhatti .................... | F01K 9/003 290/54 |
| 2009/0158736 A1 | 6/2009 | Mierisch | |
| 2009/0223510 A1* | 9/2009 | Larsen .................... | F22B 1/006 126/694 |
| 2010/0024380 A1 | 2/2010 | Sharma et al. | |
| 2010/0031655 A1* | 2/2010 | Brown .................... | F01K 9/003 60/645 |
| 2010/0212858 A1* | 8/2010 | Guth ....................... | F01K 9/003 165/45 |
| 2012/0099974 A1* | 4/2012 | Wolf ....................... | F01K 9/003 415/178 |
| 2015/0163965 A1* | 6/2015 | Parrella .................. | F01K 9/003 361/700 |

FOREIGN PATENT DOCUMENTS

| | | |
|---|---|---|
| WO | 2010/070702 A1 | 6/2010 |
| WO | 2010/098878 A1 | 9/2010 |

OTHER PUBLICATIONS

European Search Report, European Searching Authority, European Application No. 100125470, Search completed Sep. 2, 2011, Authorized Officer Stephane Coquau.

International Publication No. WO2010070702A1, Published Jun. 24, 2010, Applicant: Japan Copper Dev Ass, English Language Abstract.

Published Application No. ES2334758, Published Mar. 15, 2010, Applicant: Univ Madrid Politecnica, English Language Abstract.

Office action issued from European Patent Office dated Dec. 3, 2015 for EP Application No. 10012540.0.

* cited by examiner

STEAM POWER PLANT WITH A GROUND HEAT EXCHANGER

CROSS-REFERENCE TO RELATED APPLICATION

This is a U.S. national stage of application No. PCT/EP2011/067178, filed on Sep. 30, 2011. Priority under 35 U.S.C. §119(a) and 35 U.S.C. §365(b) is claimed from European Patent Application No. 10012540.0, filed on Sep. 30, 2010, incorporated herein in its entirety by reference.

BACKGROUND

Due to the increasing world population, the increasing energy demand and due to the international discussion concerning climate warming governments in various regions enforce the exploitation of regenerative energies. Before this background solar-thermal power plants in sunny regions in future are attributed a considerable share of the energy mix. Basically, many sunny regions are affected by water shortage. Thus it must be taken as a basis that solar-thermal power plants are often carried out with dry cooling and will thus directly be dependent on the surrounding temperature.

Generally in the thermal power plant-technique a difference is made between four various cooling methods:

1. The fresh water cooling uses cooling water from surface water, which can be redirected after the cooling-process.

2. With the cooling in wet-cooling tower the greatest cooling effect does not occur due to the surrounding air, but due to the evaporation process. Wherein, however, great water quantities are lost, for which reason this variation is not suited for regions with water shortage.

3. With the direct dry cooling the expanded water vapor in the condenser is condensed due to the direct cooling by means of air.

4. When a separate cooling cycle is present, then an indirect dry cooling is spoken of. Wherein the cooling water first of all extracts heat from the water vapor in the condenser and afterwards in the cooling-tower by means of the surrounding air is cooled again.

In regions with water shortage often direct or indirect dry-cooling systems are used with the surrounding air as the sole heat sink. The temperature of the cooling medium has a direct influence on the thermo-dynamic efficiency of a thermal power plant. In sunny, hot regions dry cooling thus directly leads to a reduced efficiency of the installed power plants. For this reason it is important to use a cooling-system getting along without nameable water losses as well as achieving an acceptable degree of efficiency in the water-steam-cycle of the power plant.

The mentioned principle-caused disadvantages of directly or indirectly air-cooled condensers with a power plant according to the invention are reduced by using the ground in the direct vicinity of the power plant as heat sink.

SUMMARY OF THE INVENTION

A possibility of dry cooling without evaporation losses and direct dependency on the actual surrounding temperature is offered by using the ground as direct heat sink. Wherein is to be taken as precondition that the ground beneath the solar field is cooler than the surrounding ground, as solar energy is taken up by the absorbers and the ground is shadowed. In full-load times of the solar power plant, when the solar radiation is most intensive and the surrounding temperature is highest, the cooling-medium, air with direct or cooling-water of a secondary-circle with indirect dry cooling additionally to the conventional cooling processes, can be cooled in a subsurface duct-system, in a so-called ground heat exchanger, below the solar field. The ground heat exchanger follows the conventional cooling. After the cooling-medium exhausted the heat difference to the surrounding air, an additional heat emission to the ground takes place. Thus in the cooling-medium cooler temperatures are reached than by mere dependency on the ambient surrounding temperature and the condensation pressure and condensation temperature at the cold end can be optimized. At night, when the solar power plant is out of operation, and the ambient temperature is lower, the ground can cool again and thus the heat storage capacity of the ground remains more or less constant.

In order to be able to use the ground as heat sink it is provided that the ground heat exchanger is designed as essentially vertically aligned ground heat exchanger or as more horizontally aligned heat basket. Both embodiments are already established and sufficiently tested in the field of ground heat use e. g. for the building climatisation and/or as heat source for heat pump installations.

Both explicitly stated design variations or hybrid forms of these design variations as well have in common that one or several conduits are inserted into the ground in an especially favorable heat-conductive manner. Subsequently a heat carrier is pumped through these conduits. The heat exchanger then emits heat to the ground. Consequently the heat carrier is cooled.

The decision concerning a certain design variation depends on the marginal conditions in the direct vicinity of the power plant.

In order not to make the operation of the steam power plant according to the invention exclusively dependent on the ground as heat sink, in further advantageous embodiment of the invention it is provided to supply an additional heat sink, preferably in the form of an indirect or direct conventional cooling system.

This second heat sink being an above-ground heat exchanger that is preferably connected to the condenser during the times when ground temperature is not lower than air temperature.

Because then it is possible in times of low outside temperatures to cool the water vapor streaming out of the steam turbine conventionally utilizing the cooling system and thus relieve the ground heat exchanger. In times without heat supply the ground surrounding the ground heat exchanger according to the invention can emit heat to further distant regions of the ground and to the surface of the ground. Thus the temperature of the ground directly surrounding the ground heat exchanger according to the invention sinks, so that with the next startup of the ground heat exchanger a cooling of the condensate to low temperatures is possible. An "exhaustion" of the heat absorption capacity of the ground is thus avoided.

In further advantageous embodiment of the invention the power plant according to the invention comprises at least one solar collector, preferably however a field of solar collectors converting a part of the solar radiation acting thereon into thermal energy and injecting this thermal energy into the water-steam-cycle of the steam power plant. Typical representatives of such solar collectors are parabolic trough solar collectors or other concentrating systems.

When the power station comprises a field of solar collectors, it is recommendable to arrange the ground heat exchanger in vertical direction below the collector field.

From thermodynamic view this is especially advantageous, because the collector field shadows the ground underneath and thus the solar radiation does not at all or only to a small degree hit the ground. Consequently the heat input by means of solar radiation to the ground used as heat sink is minimized increasing the efficiency of the ground heat exchanger according to the invention.

As further advantage of this arrangement can be seen that in the region of the collector field building measures are required anyway and consequently the additional costs for the installation of a ground heat exchanger are comparatively small.

Of course in case of a new development of a power plant according to the invention it is also possible to use other under-roof areas of the power station in order to install a ground heat exchanger. Here also applies that a construction site has to be established anyway and consequently the installation of a ground heat exchanger is possible in a relatively cost-favorable manner. Moreover, onto these under-roof areas as well no solar radiation acts and thus the ground is not heated by means of the solar radiation. Nevertheless it has to be considered that cooling of the ground via surface might be hindered depending on the building.

The concept of coupling a ground heat exchanger according to the invention with a collector field is especially effective, as solar collectors are built in areas and regions with high solar radiation intensity and there consequently the outer temperatures are relatively high.

Thus the decrease in the degree of efficiency with an exclusive dry cooling by means of the surrounding air is avoided by the claimed invention.

The object mentioned above is also solved by means of a method for operating a power steam plant, wherein the power steam plant comprises a water-steam-cycle, a steam turbine and a condenser for condensing the steam leaving the steam turbine characterized in that the condenser is directly or indirectly coupleable with a ground heat exchanger arranged in the ground.

In order to avoid repetitions the statements above in connection with the steam power plant according to the invention are referred to.

When in further advantageous embodiment of the invention in addition to the ground heat exchanger at least a further heat exchanger, especially a cooling tower conducting the condensation heat to the ambient air, is provided, then the heat exchanger according to the invention can also be connected in series with the cooling tower. Consequently the condensation heat is partially emitted to the ambient air and in the hind-connected ground heat exchanger a further cooling of the condensate is made possible so that first of all lower condensation temperatures in the condenser can be achieved. This has a positive effect on the power steam efficiency degree. As further advantage of this serial connection of the further heat exchanger and the ground heat exchanger according to the invention can be seen that the ground surrounding the ground heat exchanger has to absorb less heat, so that either the ground heat exchanger according to the invention can have smaller dimensions.

Alternatively it is also possible to alternatingly employ the ground heat exchanger according to the invention and the further heat exchanger. Thus it is possible to use the ground heat exchanger according to the invention in times of high outer temperature, i. e. in the daytime, whereas at night the further heat exchanger in the form of a cooling tower is employed. Then the power plant operation in day- and night-time can be carried out with a good degree of efficiency and the night-time can be used for the regeneration of the ground concerning its heat absorption capacity.

Further advantages and advantageous embodiments of the invention can be taken from the following drawing, the description thereof and the patent claims.

DETAILED DESCRIPTION

Figure 1:
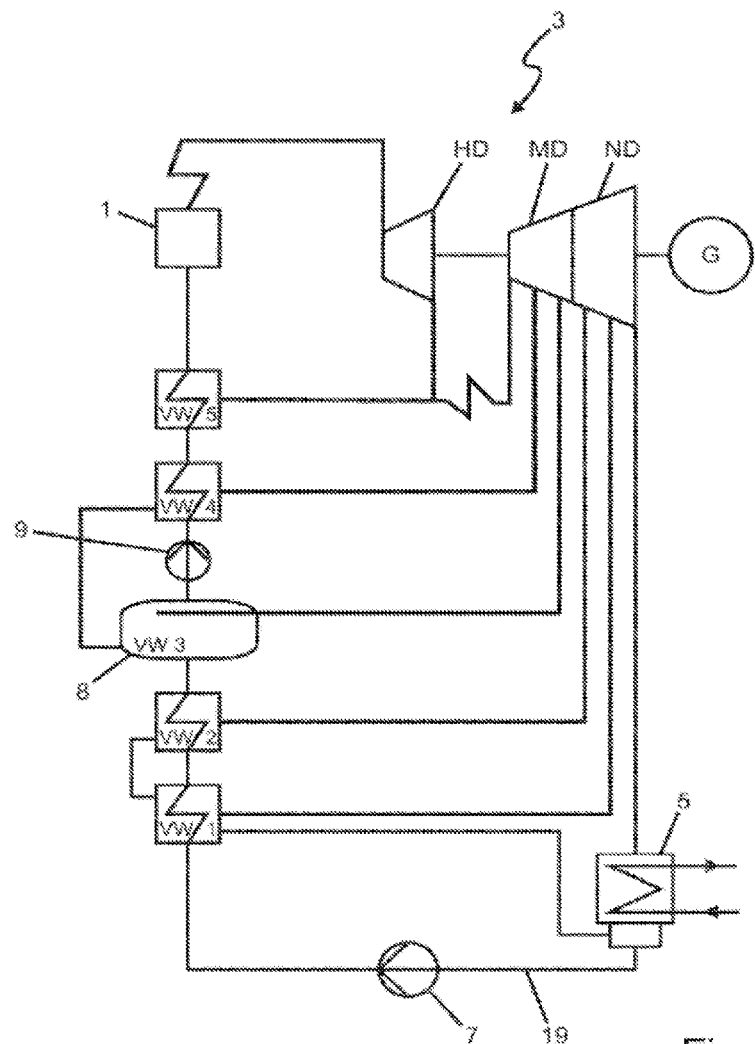
FIG. 1 A circuit diagram of a conventional steam power plant.

In FIG. 1 a steam power plant is represented as block diagram. The steam power plant can be designed as conventional steam power plant fuelled with fossils or with biomass. Alternatively the steam power plant can be designed as solar-thermal steam power plant where the energy supplied to the water-steam-cycle is generated in a collector field (cf. FIG. 2) out of solar radiation. The invention can also be used for hybrid forms, where the required energy is provided by combustion of fossil and/or organic fuels and, if available, by solar collectors.

FIG. 1 essentially serves for designating the individual components of the power plant and representing the overall context of the water-steam-cycle, as for clarity-reasons in the following figures only the parts of the water-steam-cycle essential to the invention are represented.

In a steam generator 1 utilizing fossil fuels or biomass out of the feed water live steam is generated, which is expanded in a steam turbine 3 and thus drives a generator G. The turbine 3 can be separated into a high-pressure part HD, a medium-pressure part MD and several low-pressure parts ND.

After expanding the steam in the turbine 3, it streams into a condenser 5 and is liquefied therein. For this purpose a cooling medium, as e. g. cooling water, is conveyed to the condenser 5. This cooling water is cooled in a cooling tower (not represented) or by a river in the vicinity of the power plant (not represented), before it enters the condenser 5.

The condensate generated in the condenser 5 is conveyed by a condensate pump 7 to several preheaters $VW_i$, with i=1 . . . n. In the shown embodiment a feed water tank 8 is arranged after the second preheater $VW_2$. After the feed water tank 8 a feed water pump 9 is provided.

In the context of the invention it is of significance that the condensate out of the condenser 5 is preheated with steam beginning in the first preheater $VW_1$ to the last preheater $VW_5$. Wherein the temperature of the condensate resp. feed water increases from preheater to preheater and correspondingly the temperature of the steam used for preheating also has to increase.

In the represented example the preheater $VW_5$ is heated with steam from the high-pressure part HD of the steam turbine 3, whereas the first preheater $VW_1$ is heated with steam from the low-pressure part ND of the steam turbine 3.

The third preheater $VW_3$ arranged in the feed water tank 8 and the forth preheater $VW_4$ are heated with steam from the medium-pressure part MD of the turbine 3.

When in the represented water-steam-cycle solarly generated energy/heat is injected, this energy can be injected everywhere in the water-steam-cycle between the condenser 5 and the steam turbine 3. The claimed invention is concerned with the heat dissipation from the condenser 5 and is therefore independent of the details of the water-steam-cycle.

Figure 2:
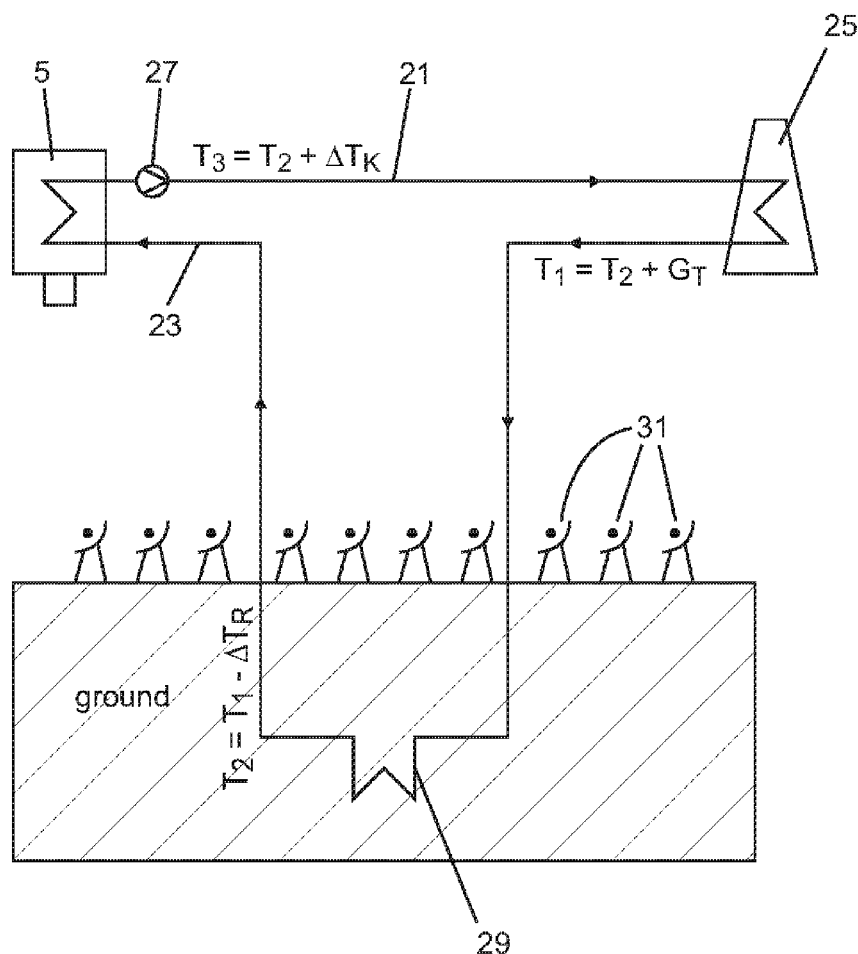
FIGS. 2 and 3 embodiments of steam power plants according to the invention.

In FIG. 2 the condenser 5 from FIG. 1 is shown. The condenser 5 is connected to a further heat exchanger in the form of a cooling tower 25 via a feed line 21 and a return line 23. In the feed line 21 as well as the return line 23 a heat carrier circulates, as e. g. water, being conveyed by a pump 27. This system is a so-called indirect air cooling; indirect for the reason that the condensation heat emitted in the condenser 5 is transported via the heat carrier circulating in the lines 21 and 23 to the cooling tower 25 and there emits its heat to the ambient air.

According to the invention it is now provided that additionally or alternatively to the cooling tower 25 a ground heat exchanger 29 is arranged in the direct vicinity of the steam power plant. The ground heat exchanger 29 according to the invention is only shown schematically in FIGS. 2 and 3. They can be any kind of ground heat exchanger, either ground heat exchangers vertically driven into the ground, as they are e. g. known for heating buildings or as heat source for heat pump installations. Alternatively it is also possible to design the ground heat exchanger 29 as more or less plane construction being arranged in a constant distance of e. g. 5 m in the ground below the surface.

All embodiments have in common that the ground heat exchanger 29 is streamed through by the heat carrier circulating in the feed line 21 and the return line 23 and thus emits heat to the ground surrounding the ground heat exchanger 29.

In FIG. 2 a method of operation is shown wherein the further heat exchanger 29 resp. the cooling tower 25 and the ground heat exchanger 29 according to the invention are connected in series.

The heat carrier leaves the condenser 5 with a temperature T3. The heat carrier with the temperature T3 is cooled to a temperature T1 in the cooling tower 25. Then the heat carrier streams into the ground heat exchanger 29 according to the invention with this temperature T1 as entry temperature and therein is further cooled to a temperature T2. The temperature T2 is lower than the temperature T1, as the heat carrier in the ground heat exchanger 29 emits heat to its surrounding ground. With the temperature T2 the heat carrier re-enters the condenser 5 and therein absorbs the condensation heat of the steam leaving the steam turbine 3. As the temperature T2 with which the heat carrier enters the condenser 5 due to the serial connection is lower than the exit temperature T1 of the heat carrier out of the cooling tower 25, the degree of efficiency of the power plant is increased.

Exemplary values for the temperatures T1 to T3 are enlisted in the following:

T1 40° C. to 45° C.
T2 35° C. to 40° C.
T3 50° C. to 55° C.
$\Delta T_K$: Temperature increase of heat carrier in condenser
TL: Ambient Air Temperature and
$G_T$: Temperature difference in cooling tower By means of FIG. 2 it is indicated that the power plant according to the invention can also comprise a field of solar collectors 31 which are schematically designed as parabolic trough solar collectors. On the one hand these solar collectors 31 contribute to the reduction or complete compensation of the demand of fossil fuels or biomass as fuel. At the same time however concerning the ground heat exchanger 29 according to the invention they have the advantage of shadowing the ground surrounding the ground heat exchanger 29 and thus preventing resp. minimizing the penetration of solar radiation into the ground undesirable in this case.

Figure 3A:
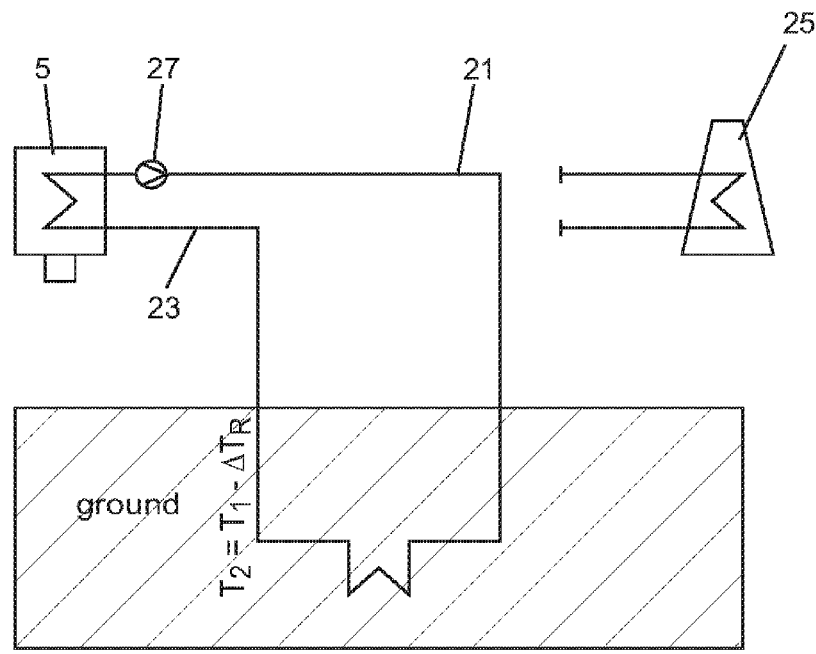

In FIG. 3 an alternative operation mode is represented. With this operation mode according to FIG. 3a the heat carrier is exclusively cooled via the ground heat exchanger according to the invention and the cooling tower 25 is not active. This signifies that the degree of efficiency of the ground heat exchanger 29 according to the invention with otherwise identical conditions must generally be somewhat larger in order to be able to provide the temperature T2 of the heat carrier.

This operation condition e. g. can be sensible when the outer temperatures are very high so that a nameable contribution of the cooling tower 25 for the emission of the condensation heat cannot take place. Generally in sunny regions this will be the case in daytime.

Figure 3B:
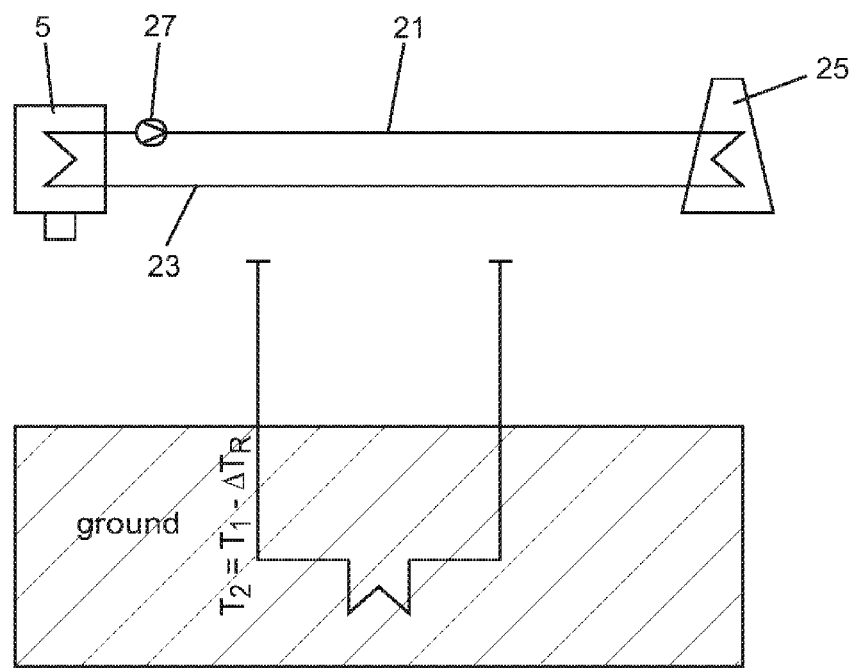

In FIG. 3b the operation during the night resp. with low outer temperatures is shown. In this case the condenser 5 is exclusively connected with the cooling tower 25 and the ground heat exchanger 29 according to the invention is not active. During these times, which generally occur at night, the ground surrounding the ground heat exchanger 29 can cool again. Thus the efficiency of the ground heat exchanger 29 for the following day is reestablished.

Of course hybrid forms of the operation modes represented according to the FIGS. 2 and 3 are also possible. Especially it is also possible to use the ground heat exchanger 29 according to the invention predominantly in hot seasons and to regenerate in the cold season by not operating it. Then over weeks or even months the ground surrounding the ground heat exchanger 29 can emit heat to further distant regions and to the ambience through the surface of the ground. Thus the temperature of the ground sinks and the efficiency of the ground heat exchanger 29 according to the invention is reestablished.

Alternatively to the described follow-up variation it is possible under circumstances, to select the ground cooling as sole cooling-method. In this case a conventional cooling is dispensed with and only the ground heat exchanger serves as heat sink for condensation. In this case as cooling medium the water of a secondary cycle or air is imaginable.

Depending on the local situation and the regional temperature profile in the ground the ground heat exchanger can also be designed two-dimensionally with rather horizontal orientation or going into the deep.

If necessary, the ground cooling can also be used for conventional power plants in regions with a high temperature difference between day and night (subtropical climate). In the day heat the ground is used for cooling and at night the power plant is operated by surrounding air-cooling and the ground can cool down.

The invention claimed is:
1. A steam power plant comprising:
a steam turbine;
a condenser;
a first heat sink; and
a second heat sink,
wherein the first heat sink is a ground heat exchanger and the second heat sink is an above-ground heat exchanger,
wherein the steam power plant is operational in at least two modes:
an operational mode with the first heat sink and second heat sink connected in a serial connection with the condenser; and another operational mode with the first heat sink in both fluid and thermal communication with the condenser when a ground temperature is less than an air temperature and with the second heat sink in both fluid and thermal communication with the condenser when the ground temperature is not less than the air temperature.

2. The steam power plant according to claim 1, wherein the ground heat exchanger is vertically or horizontally oriented.

3. The steam power plant according to claim 1, wherein the above-ground heat exchanger is an indirect cooling system.

4. The steam power plant according to claim 1, wherein the steam power plant comprises at least one solar collector.

5. The steam power plant according to claim 4, wherein the least one solar collector is installed above the ground heat exchanger.

6. A method for operating a steam power plant comprising a water-steam-cycle, a steam turbine and a condenser for condensing the steam escaping from the steam turbine, the method comprising the steps of:
   providing a heat carrier fluid from the condenser to a first heat sink comprising a ground heat exchanger and to a second heat sink comprising an above-ground heat exchanger; and
   operating the steam power plant in at least two modes:
      an operational mode with the first heat sink and second heat sink connected in a serial connection with the condenser; and
      another operational mode with the first heat sink fluidly connected to the condenser when a ground temperature is lower than an air temperature and the second heat sink fluidly connected to the condenser when the ground temperature is not lower than the air temperature.

7. The method according to claim 6, wherein the above-ground heat exchanger is a cooling tower, and that the condenser is directly or indirectly coupleable to the cooling tower.

8. A cooling system for a steam power plant comprising:
   a condenser;
   a first heat sink comprising a ground heat exchanger; and
   a second heat sink comprising an above-ground heat exchanger;
   wherein the steam power plant is operational in at least two modes:
      an operational mode with the first heat sink and second heat sink connected in a serial connection with the condenser; and
      another operational mode with the first heat sink in thermal communication with the condenser during times when a ground temperature is lower than an air temperature and with the second heat sink in thermal communication with the condenser when the ground temperature is not lower than the air temperature.

9. The system of claim 8, wherein the above ground heat exchanger provides indirect cooling.

10. The system of claim 8, wherein the ground heat exchanger is a vertically aligned ground heat exchanger.

11. The system of claim 8, further comprising:
   at least one solar collector;
   wherein the at least one solar collector provides thermal energy to the steam power plant and shadows the ground surrounding the ground heat exchanger to minimize the penetration of solar radiation into the ground.

12. The system of claim 11, wherein the at least one solar collector is a parabolic trough solar collector.

13. The steam power plant according to claim 1, wherein the steam power plant comprises a plurality of solar collectors, the solar collectors disposed above the ground heat exchanger and being configured to shadow the ground surrounding the ground heat exchanger to minimize the penetration of solar radiation into the ground.

* * * * *